UNITED STATES PATENT OFFICE.

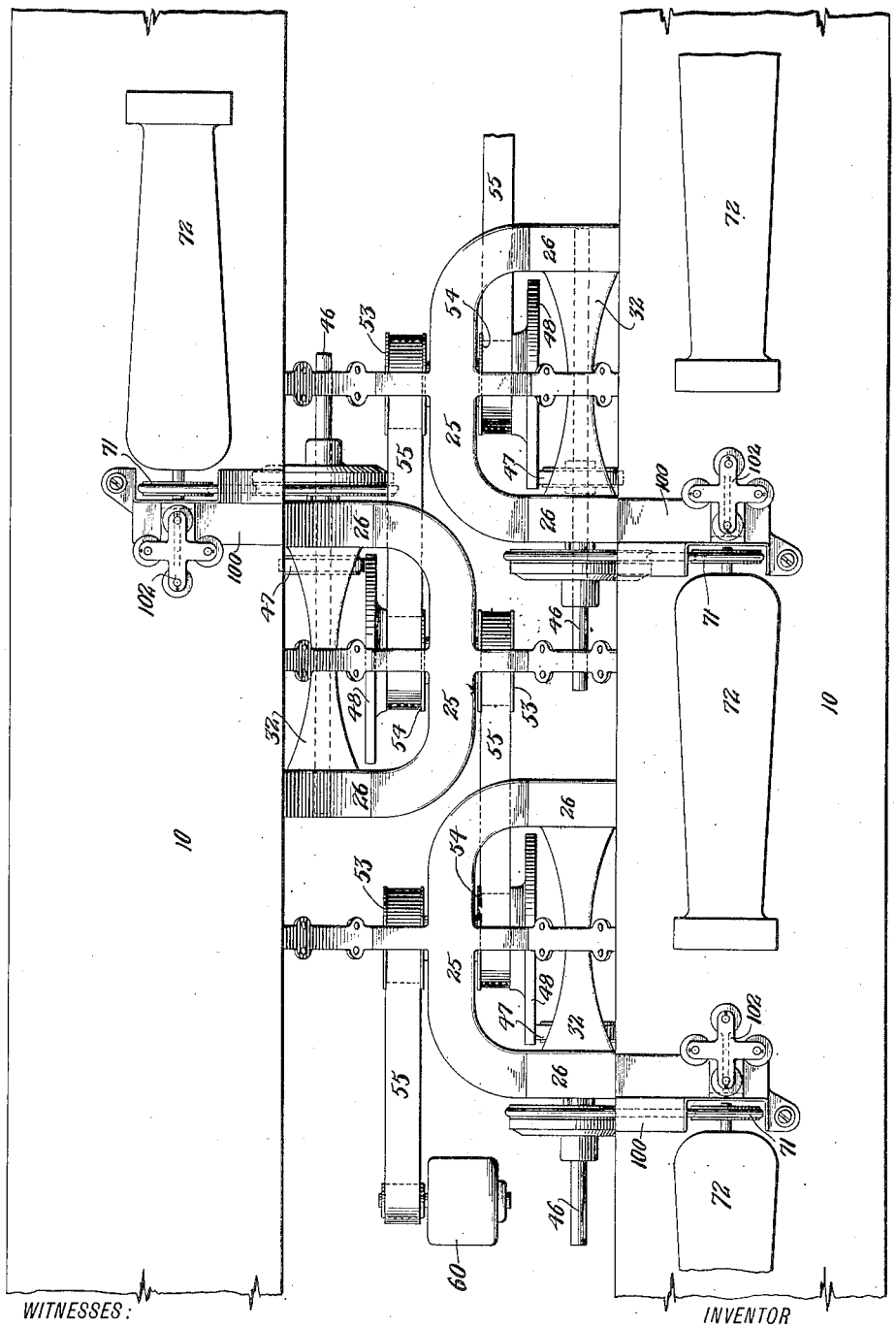

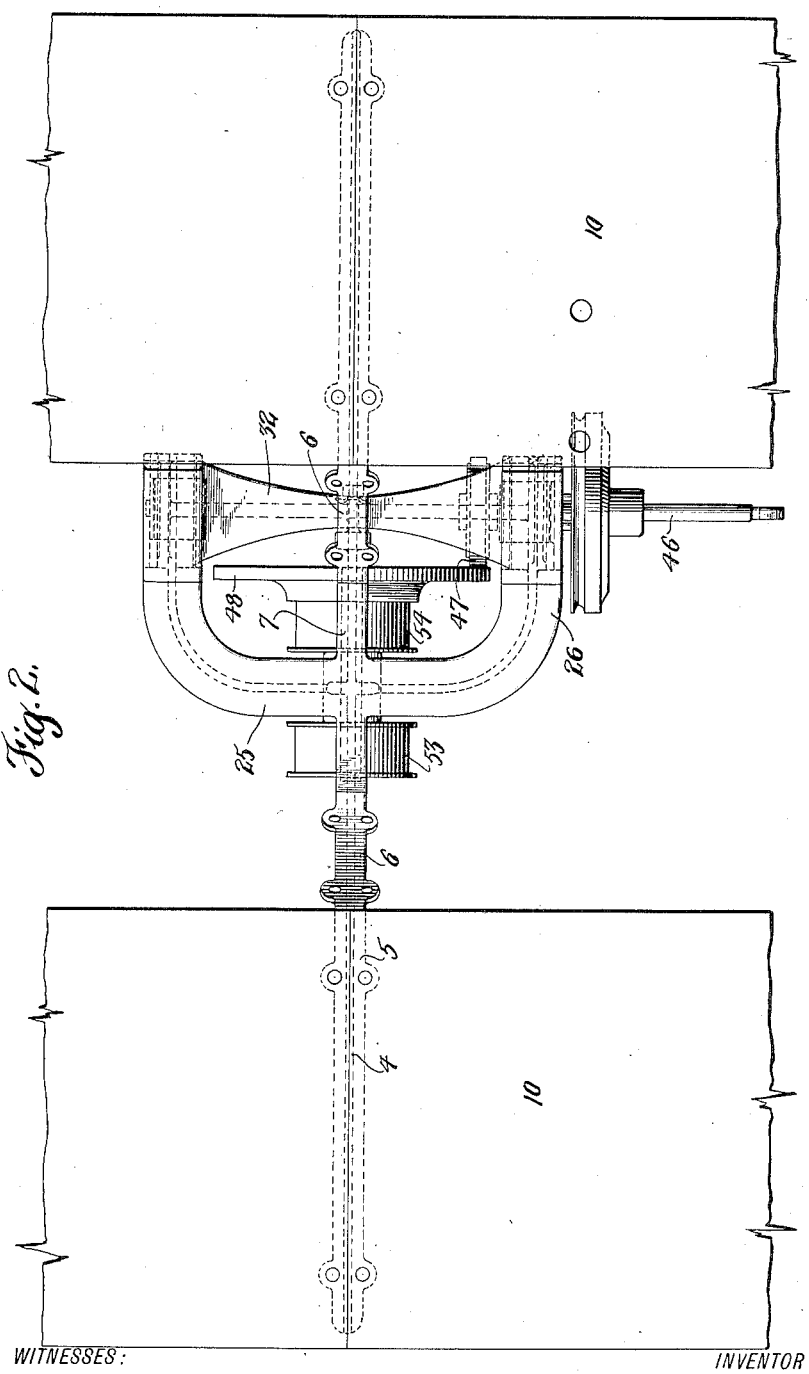

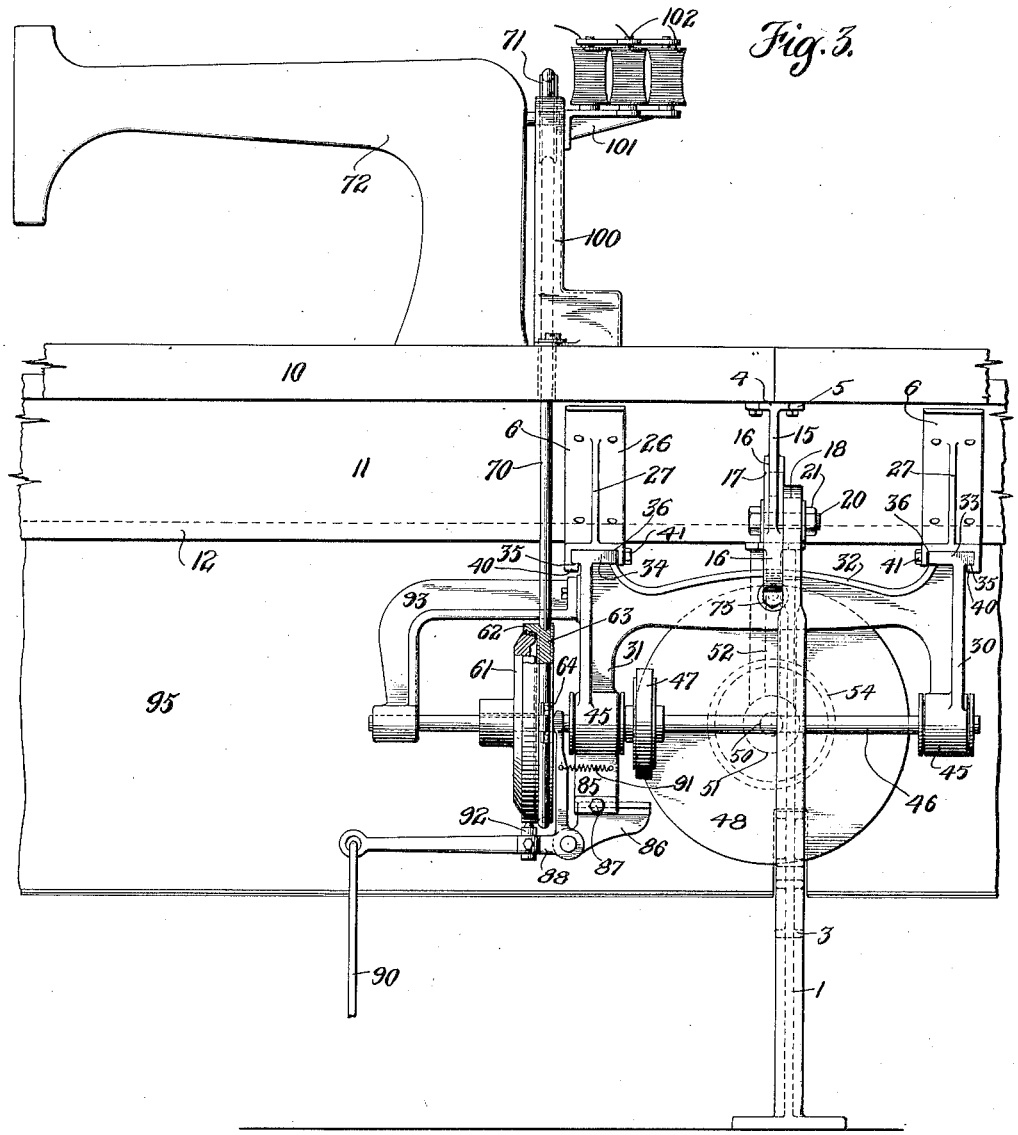

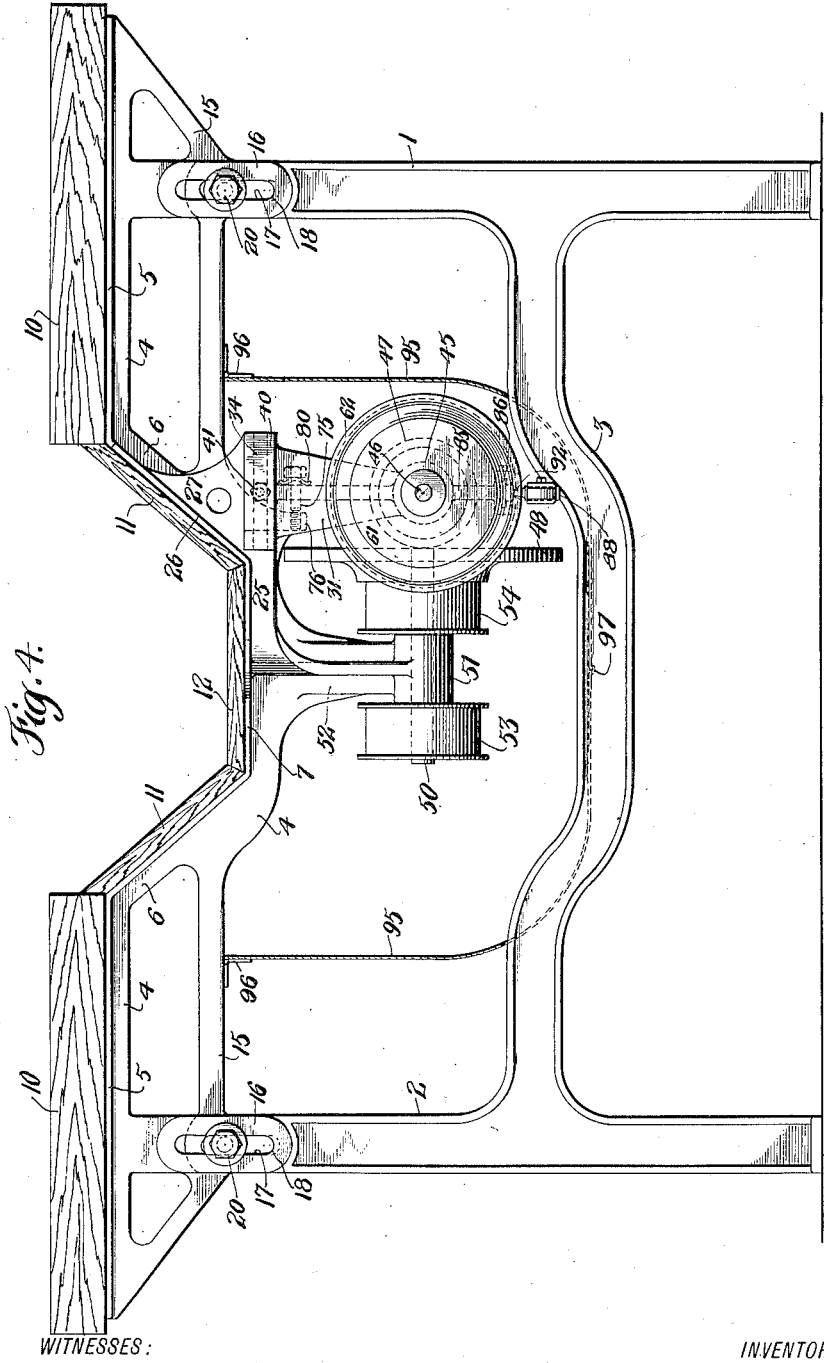

MEYER AXILROD, OF READING, PENNSYLVANIA.

COMBINATION TABLE AND SHAFT SUPPORT.

1,379,158.              Specification of Letters Patent.       Patented May 24, 1921.

Application filed February 28, 1920. Serial No. 362,099.

*To all whom it may concern:*

Be it known that I, MEYER AXILROD, a citizen of the United States, and a resident of Reading, in the county of Berks and State of Pennsylvania, have invented an Improvement in Combination Table and Shaft Supports, of which the following is a specification.

My invention relates to a combination table and shaft support, and it has for its object broadly to provide improvements in table or other like supports and shaft hangers carried upon the said supports and so related or adapted to be so related thereto that when a plurality of supports are situated at intervals underneath a table the said shaft hangers may occupy positions alternately underneath opposite side portions of the table.

The alternate arrangement referred to is desirable in case my invention is employed in connection with a table for supporting sewing machines employed in a factory and in which a plurality of machines are supported at intervals upon the opposite sides of the table.

In such case it is desirable that the shaft or shafts for operating the machines upon one side of the table shall be supported by hangers or supports situated upon the same side of the table, preferably underneath the same.

Although my invention is shown in connection with a table for supporting a plurality of sewing machines situated at intervals upon opposite sides of the table, it will be understood that it may be adapted for other uses and purposes than that illustrated.

A further object of my invention is to provide a support of the character stated having means whereby one portion may be adjusted relatively to another portion, whereby the height of the table may be varied and whereby it may be readily leveled.

A still further object is to provide means upon the adjustable portion of the said support for supporting a shaft or shafts, which means, upon the adjustment of the said support, is likewise adjusted.

Still another object of my invention is to provide means whereby friction driving and transmission members may be held in yielding contactual relation with respect to each other; also to provide means whereby the pressure of contact between the said members may be varied or adjusted.

A further object is to provide means whereby the driving and transmission mechanism for operating machines or otherwise performing work may be situated alternately upon opposite sides of a central medial line extending longitudinally of a table or other like structure.

Other objects and advantages of my invention will be pointed out in the detailed description thereof which follows or will be apparent from such description.

In order that my invention may be readily understood and its practical advantages fully appreciated, reference may be had to the accompanying drawings in which I have illustrated one form of embodiment thereof. However, it will be understood that my invention is susceptible of embodiment within the scope of the claims in other forms of construction than that shown.

In the drawings:

Figure 1 is a top plan view of a portion of a table, the central portion thereof being removed so as to show portions of the supports in top plan, the said view also showing a plurality of machines upon the table, their relative arrangement with respect to each other being indicated;

Fig. 2 is an enlarged top plan view similar to that shown in Fig. 1 but showing a single support in top plan and also showing the structure in greater detail;

Fig. 3 is a view in side elevation of a portion of a table, one of the supports therefor, the driving and transmission means, a portion of the latter being shown in section, and also showing said support in end elevation; and Fig. 4 is a view in end elevation of a table, looking toward the right at the driving and transmission mechanism and the supports therefor, shown in Fig. 3, and showing one of the combination table and shaft hangers or supports in side elevation..

Referring to the drawings: 1 and 2 designate the legs of a support for a table or the like situated in opposed relation with respect to each other and connected by a cross or tie member 3, preferably integral therewith. 4 designates a top rail having horizontally extending portions 5 at its opposite end portions, inwardly and downwardly inclined portions 6 and a central horizontal portion 7. These portions are adapted to support the table top, the outer horizontal portions of which are indicated at 10, the inwardly and downwardly inclined portions at 11, and the central longitudinally extending horizontal portion at 12.

The respective top rails are provided upon the underneath sides of their opposite outer end horizontal portions with a bracket-like structure 15 comprising depending portions 16 provided with slots 17. These depending slotted portions are situated upon the sides of the upper ends of the legs 1 and 2 which likewise are slotted as indicated at 18. The upper ends of these legs and the portions 16 are secured together by means of headed bolts and nuts 20 and 21. The top rail together with the table supported thereon may be adjusted vertically either up or down by loosening the nuts 21 and either raising or lowering the said rail as may be desired.

Each of the rails is provided at its central portion with laterally extending arms or brackets 25 which arms preferably are integral with the said rail. The said arms are bent or curved as shown in the drawings so that their outer end portions extend in directions toward an outer edge of the table and in parallel spaced relation to the said top rails 4.

The outer end portions of said arms or brackets are provided with upwardly and outwardly inclined table supporting portions 26, the said last mentioned portions being connected with the said arms or brackets by means of gussets 27.

Each top rail is provided with a pair of arms and each said pair is adapted to support a shaft hanger or support. Each shaft hanger or support consists of a member having depending bracket-like members 30 and 31 connected together by means of an integral cross or tie bar 32. The upper ends of the bracket-like members 30 and 31 adjacent the opposite ends of the tie or cross bar 32 are provided with head parts 33 and 34, each of which comprises flange or projecting portions 35. These heads are adapted to enter relatively wide rectangularly shaped grooves or slots 36 in the outer ends of the arms or brackets 25. The outer walls of these slots terminate in inwardly extending flanges 40 which are adapted to engage the under sides of the flanges 35 of the heads 33 and 34. The heads 33 and 34 are adapted to be moved inwardly and outwardly in the grooves or slots 36 and to be held in adjusted position by means of the binding screws 41. The lower ends of the bracket-like parts 30 and 31 are provided with bearing sleeves 45 in which a shaft 46 is revolubly supported. The said shaft is provided with a friction disk 47, the periphery of which is adapted to engage the outer face of a friction plate 48 mounted upon a shaft 50 supported in a relatively long bearing 51 provided in the lower end of a bracket 52 depending from the central portion of the top rail 4. The said shaft is provided with pulleys 53 and 54. By means of the first pulley the said shaft is adapted to be driven and by means of the second pulley the said shaft is adapted to transmit motion to a shaft corresponding to the shaft 50 situated a distance therefrom. Transmission belts 55 are provided for this purpose. Power for driving these various parts may be obtained from an electric motor 60. The relative arrangement of the friction disks and plates 47 and 48 and the driving and transmission mechanism just previously described is shown in Fig. 1 of the drawings. From this figure it will be apparent that the top rails with the parts associated therewith and supported thereby are situated at intervals underneath the table top.

Each of the shafts 46 is provided with a clutch member 61 secured thereto to rotate therewith. The periphery of each of the clutch members 61 is adapted to frictionally engage the inner side of an annular flange 62 upon a pulley 63 mounted upon a shaft 46 and adapted to rotate independently thereof. The said pulleys are respectively mounted upon ball bearing devices 64 which in turn are mounted directly upon the respective shafts 46. Bands or cords 70 extend from the pulleys 63 upwardly to pulleys 71 for driving the operating mechanism of a sewing machine the head of which is indicated at 72.

In order to vary or control the pressure contact between the periphery of the respective friction disks 47 and friction plates 48, I have provided screw bolts 75, the inner ends of which engage screw threaded openings in lugs or projections 76 which depend from the under sides of the top rails 4. By screwing such bolts inwardly the shaft hangers or supports are pulled toward the outer faces of the friction plates 48. Upon loosening the said bolts the pressure of the said friction disks upon the said friction plates is lessened or decreased. In order that the friction disks 47 may have yielding contact relation with respect to the friction plates 48, spring washers 80 are interposed between the heads of the screw bolts 75 and the central portion of the cross or tie bar 32. It will be noted that the bolts 75 extend through openings through the said cross or tie bars 32 substantially at the centers thereof.

Although I have not indicated any means for effecting adjustment of the friction disks 47 upon the shafts 46, it will be understood that the said disks may be adjusted longitudinally of the said shafts across the faces of the friction plates so as to regulate the speed of rotation of the said disks and also the direction of rotation thereof. For instance, if the disk 47 in Fig. 3 were adjusted across the front face of the friction plate 48 to a position beyond the center thereof, it is apparent that the direction of rotation of the said friction disk would be changed.

The depending bracket-like parts 31 of the respective shaft hangers or supports are provided with projections 85 to which brackets 86 are adjustably connected, being held in adjusted position by means of a binding screw or bolt 87. A bell crank lever 88 is pivoted upon the lower end of each said bracket 86. The said lever is actuated by a link 90 having connection with the outer end of the horizontal arm thereof. The other arm of said lever extends upwardly and is adapted to contact with the ball bearing device 64. A spring 91 tends to hold the upper end of said vertically or upwardly extending arm away from the said ball bearing device 64.

When it is desired to operate a sewing machine, the link 90 is actuated to depress the horizontal arm of the bell crank lever 88, causing the upwardly extending arm thereof to force the pulley 63 into frictional engagement with the clutch 61. When this occurs rotative movement of the latter is transmitted to the said pulley to drive the cord or belt 70. The latter drives the pulley 71.

When the lever 88 is released the pulley 63 becomes disengaged from the clutch member 61 so that it is not driven thereby and in order to quickly stop rotation of the said pulley 63 the brake device 92, secured upon the horizontal arm of the bell crank lever 88, contacts with the peripheral surface of the flange portion 62 of the said pulley and brakes or holds the same.

In order to steady the end portion of the shaft 46 beyond the clutch and pulley members 61 and 63, I have provided a laterally and downwardly extending bracket 93 which is connected to the outer side of the upper portion of the depending part 31. The end portion of said shaft 46 is journaled in a bearing upon the said bracket 93.

Upon reference to Fig. 1 of the drawings, it will be observed that the arms or brackets 25 upon alternate top rails extend in opposite directions with respect to each other; also that said arms or brackets may be described as being situated in staggered arrangement with respect to each other. It will likewise be observed that the friction plates 48 are situated alternately on opposite sides of a central longitudinal medial line of the table structure and that the transmission and driving belts 55 are also so situated with respect to each other and with respect to a medial line or plane extending longitudinally of the table.

In order to render the use of the apparatus as disclosed in the drawings entirely safe, I have inclosed the power and transmission mechanism within the plates 95 hinged at 96 to the underneath edges of the bracket-like portions 15 of the top rails. The inner lower edges of these hinged plates 95 are detachably connected with each other as indicated at 97.

I have likewise provided safety means for the portions of the driving bands or cords 70 above the table top and also for the greater portions of the pulleys 71. This safety means comprises shields or casings 100, which are secured to the horizontal outer portions 10 of the table top. These casings extend in parallel relation to the vertical portions of the heads 72 and are open at their inner sides as shown to facilitate their placement in position. Each of these casings or shields is provided adjacent its upper end with a bracket 101 provided with spool supporting means 102 thereon upon which thread bearing spools are rotatably mounted.

It will be seen that by my invention I have provided a combination table and shaft support the parts of which are so combined as to constitute and form a unitary structure which is relatively simple and is very desirable because not only of the economy in space involved in the use thereof but also because of the economy due to the readiness and ease with which the top rails may be adjusted to effect adjustment of the table top and simultaneously of the shaft bearing portions of the mechanism and consequently the shafts themselves.

I claim:

1. In a combination table and shaft support, the combination of legs, a top rail having adjustable connection with said legs, said rail being provided with a pair of arms projecting laterally in opposite directions from points intermediate its ends, the outer end portions of said arms extending outwardly toward one edge of the table and in spaced relation to the adjacent portion of said rail, and a shaft support having connection with said arms.

2. In a combination table and shaft support, the combination of legs, a top rail supported upon said legs, said rail being provided with a pair of arms projecting laterally therefrom from a point intermediate the ends thereof, the outer ends of which arms extend toward an end of the said rail and being substantially parallel therewith, and a shaft support having adjustable connection with the said arms.

3. In a combination table and shaft support, the combination of legs, a top rail having adjustable connection with said legs, said rail being provided with a pair of arms projecting laterally from an intermediate portion thereof, the outer ends of said arms extending toward an end of the said rail and being substantially in parallel relation with respect thereto, a bracket depending from the outer end of each of said arms, a tie bar connecting said brackets and the lower end portions of the said brackets being provided with bearings for supporting a shaft.

4. In a combination table and shaft support, the combination of legs, a top rail having adjustable connection with said legs, said rail being provided with a pair of arms projecting from an intermediate portion thereof, the outer ends of which extend toward an end of said rail and in substantially parallel and spaced relation with respect thereto, and the outer ends of said arms being provided with sockets, depending brackets having heads in engagement with the said sockets, said brackets having rigid connection with each other and each of the said brackets being provided with a bearing at its lower end, and a shaft revolubly supported in the said bearings.

5. In a combination table and shaft support, the combination of legs, the upper end portions of said legs being provided with openings therethrough, a top rail having depending brackets at its opposite ends, said brackets being provided with slots extending therethrough, means extending through said slots and through the openings in the upper portions of said legs for adjustably connecting the said top rail to the upper end portions of the said legs, and the said top rail being provided with a pair of arms projecting laterally from an intermediate portion thereof, the outer ends of said arms extending in a direction parallel with the said top rail and being spaced therefrom, a shaft support and means for adjustably connecting the said shaft support with the said arms.

6. In a combination table and shaft support, the combination of legs having openings extending through the upper end portions thereof, a top rail having depending brackets adjacent its opposite ends, said brackets having openings extending therethrough, means extending through said openings for adjustably connecting the top rail to the said legs, the said top rail being provided with arms which project laterally from an intermediate portion thereof, the outer ends of said arms extending in parallel spaced relation with respect to the said top rail, a shaft support having adjustable connection with the end portions of said arms, and means engaging the said shaft support and a projection from the said rail for yieldingly holding the said shaft support in a predetermined position.

7. In a combination table and shaft support, the combination of legs, a top rail, pin and slot connections between the said legs and the said rail whereby the latter may be adjustably connected with and supported upon said legs, the said rail being provided with arms projecting laterally from an intermediate portion thereof, the outer ends of said arms projecting in a direction parallel with the said rail and in spaced relation with respect thereto upon opposite sides thereof, the outer ends of said arms being provided with sockets, a shaft supporting bracket having heads in adjustable engagement with said sockets, adjustable means for connecting said shaft supporting bracket to the said top rail, and yielding means interposed between said adjustable means whereby said bracket may be yieldingly held in predetermined position.

8. In a combination table and shaft support, the combination of legs, a top rail having adjustable connection therewith, arms extending laterally in opposite directions from an intermediate portion of said rail, the outer end portions of said arms extending in parallel relation to said rail and in spaced relation with respect thereto, a shaft supporting member comprising depending brackets integrally connected at their upper ends by a tie bar extending between the same, means for adjustably connecting the upper ends of said depending brackets to the outer ends of said arms, and means for adjustably connecting the said tie bar to the said top rail.

9. In a combination table and shaft support, the combination of legs, a top rail having adjustable connection therewith, arms extending laterally in opposite directions from an intermediate portion of said rail, the outer end portions of said arms extending in parallel relation to said rail and in spaced relation with respect thereto, a shaft supporting member comprising depending brackets integrally connected at their upper ends by a tie bar extending between the same, means for adjustably connecting the upper ends of said depending brackets to the outer ends of said arms, means for adjustably connecting the said tie bar to the said top rail, and a yielding member interposed between said last mentioned means and the said tie bar whereby the said shaft supporting member may be yieldingly held in a predetermined position.

10. In a combination table and shaft support, the combination of a top rail, supports therefor, the said top rail being provided with a bracket depending from the central portion thereof, said bracket having a shaft bearing at its lower end and the said rail also being provided with a pair of arms projecting laterally and in opposite directions therefrom, the outer ends of said arms extending in parallel spaced relation with respect to the said top rail, a shaft supporting bracket having adjustable connection with the said arms, said shaft supporting bracket having depending portions at its opposite ends provided with shaft bearings at their lower ends, the said shaft bearings extending in directions substantially at right angles to the direction of the bearing in the bracket depending from the said top rail, a shaft supported in the first named bearing and a shaft supported in the second named bearings, the said bearings being arranged in substantially right angular relation with respect to each other.

11. In a combination table and shaft support, the combination of a top rail, supports therefor, the said top rail being provided with a bracket depending from the central portion thereof, said bracket having a shaft bearing at its lower end and the said rail also being provided with a pair of arms projecting laterally and in opposite directions therefrom, the outer ends of said arms extending in parallel spaced relation with respect to the said top rail, a shaft supporting bracket having adjustable connection with the said arms, said shaft supporting bracket having depending portions at its opposite ends provided with shaft bearings at their lower ends, the said shaft bearings extending in directions substantially at right angles to the direction of the bearing in the bracket depending from the said top rail, a shaft supported in the first named bearing and a shaft supported in the second named bearings, the said bearings being arranged in substantially right angular relation with respect to each other, and friction driving members supported upon the said shafts and being adapted to contact with each other, one of said members being driven by the other.

12. In combination, a plurality of combination table and shaft supports arranged in substantial parallel relation with respect to each other at intervals underneath a table or other like structure, each of the said supports comprising top rails, supports for said rails, each of said rails being provided with a pair of arms projecting laterally and in opposite directions from an intermediate portion thereof, the outer ends of each pair of arms extending in a direction parallel with and in spaced relation with respect to the top rail from which they project, and the arms of alternate top rails extending in opposite directions toward opposite sides of the table or other structure supported upon said combination supports.

13. In combination, a plurality of combination table and shaft supports, each combination support comprising legs and a top rail having adjustable connection with the upper end portions of said legs and each top rail being provided with a shaft supporting bracket depending from the central portion thereof and also being provided with a pair of arms projecting laterally and in opposite directions from the central portion thereof, the outer end portions of said arms extending in the same direction and in spaced relation with respect to the said top rail, a shaft supporting member having adjustable connection with and depending from the outer end portions of said arms, said member having bearings in spaced relation with respect to each other, said bearings being in alinement, shafts supported respectively by the said bracket and by the said shaft supporting member, and the laterally projecting arms of alternate top rails extending in opposite directions toward opposite sides of the table or other structure, substantially as described.

14. In combination, a plurality of combination table and shaft supports situated at intervals in substantial parallel relation with respect to each other, each of the said supports being provided with a pair of arms projecting laterally in opposite directions therefrom, the outer portions of the arms of alternate supports extending in opposite directions toward opposite sides of a table or other structure, and shaft supporting means carried by the outer end portions of said arms, substantially as described.

15. In combination, a plurality of combination table and shaft supports arranged at intervals each support comprising means for supporting a couple of shafts, one of the shafts supported by each support extending in a direction transversely of the said supports and the other shaft extending in a direction substantially parallel with the said supports, and the said means of alternate supports being situated upon opposite sides of a medial line extending longitudinally of the table or other structure.

16. In combination, a plurality of combination table and shaft supports, the said supports being arranged at intervals in substantially parallel relation with respect to each other, and each support comprising a top rail having a bracket depending from an intermediate portion thereof, said bracket being provided with a shaft bearing, the axis of which extends transversely of the said table and each top rail being also provided with a pair of arms projecting laterally in opposite directions from an intermediate portion thereof, the outer ends of said arms extending outwardly and in substantially parallel relation to the said top rail, a shaft supporting member having adjustable connection with the outer ends of said arms, said member having depending projections provided at their lower ends with shaft bearings extending in a direction substantially at right angles to the first named bearing, a shaft revolubly supported in the first named bearing and having a friction plate secured thereto, a shaft revolubly supported in the second named bearings and provided with a friction disk the periphery of which is adapted to engage the face of said friction plate, and means for connecting the successive shafts mounted in the first named brackets whereby when one of said shafts is driven the others may likewise be driven for driving the respective friction disks, substantially as described.

17. In combination, a plurality of combination table and shaft supports situated at intervals and in substantially parallel relation with respect to each other, each support comprising a top rail, means carried by each of said top rails for supporting a plurality of shafts, the said shafts, and safety means for inclosing the said shafts and the means for supporting the same, which safety means is connected with and supported by the said top rails, substantially as described.

18. In a combination table and shaft support the combination of a plurality of pairs of legs, the said pairs of legs being arranged in parallel relation with respect to each other, a top rail supported upon and connecting each pair of legs, each rail being provided with a pair of arms projecting laterally in opposite directions from points intermediate its ends, the outer end portions of said arms extending outwardly toward one edge of the table and in spaced relation to the adjacent portion of said rail, the arms upon the said rails extending alternately in opposite directions, and shaft supports having connection with said arms.

In testimony that I claim the foregoing as my invention, I have hereunto signed my name this 21st day of February A. D., 1920.

MEYER AXILROD.